United States Patent

[11] 3,607,049

[72] Inventors Howard Weaver, Jr.;
Robert B. Roaper, II, both of Ashtabula, Ohio
[21] Appl. No. 4,979
[22] Filed Jan. 22, 1970
[45] Patented Sept. 21, 1971
[73] Assignee Cabot Corporation
Boston, Mass.
Continuation-in-part of application Ser. No. 705,979, Feb. 16, 1968, now Patent No. 3,493,342.

[54] COOLING OF PYROGENIC TITANIUM DIOXIDE PIGMENT CONTAINING GAS STREAMS
7 Claims, 1 Drawing Fig.
[52] U.S. Cl. .................................................. 23/202 V, 23/1, 106/300, 165/1
[51] Int. Cl. .................................................. C01g 23/04
[50] Field of Search ........................................ 106/300; 23/202, 202 V, 1, 142

[56] References Cited
UNITED STATES PATENTS

| | | | |
|---|---|---|---|
| 2,508,272 | 5/1950 | Booge | 23/202 |
| 2,721,626 | 10/1955 | Rick | 23/202 X |
| 2,899,278 | 8/1959 | Lewis | 23/202 |
| 2,909,409 | 10/1959 | Gregory | 23/202 |
| 2,990,249 | 6/1961 | Wagner | 23/142 |
| 3,217,787 | 11/1965 | Preston | 165/1 |
| 3,224,215 | 12/1965 | Bramekamp et al. | 62/120 |
| 3,310,377 | 3/1967 | Stern et al. | 23/202 |
| 3,493,342 | 2/1970 | Weaver et al. | 23/202 |

*Primary Examiner*—Edward Stern
*Attorneys*—Kenneth W. Brown, Arthur S. Collins, Barry R. Blaker and Lawrence E. Chaletsky ABSTRACT: The present invention relates to an improved method for the cooling of pyrogenic titanium dioxide pigment suspended in reaction product gas streams. Broadly, the process involves a gas quench of said suspension followed by indirect heat exchange cooling thereof and treatment of the cooled process gases with water. The pigment is collected from the process gases of the suspension and at least a portion of said process gases are recycled as the gas quench.

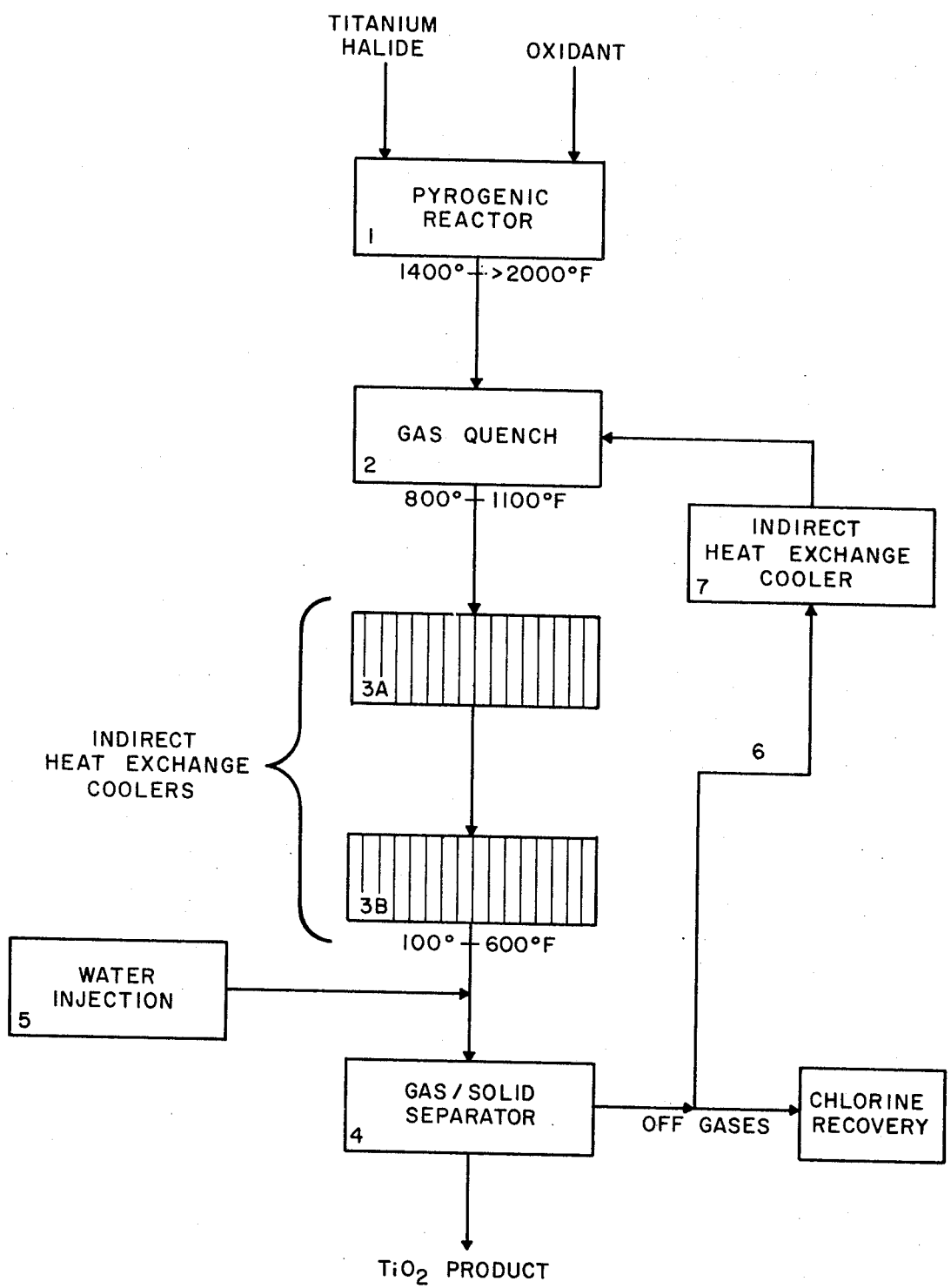

COOLING OF PYROGENIC TITANIUM DIOXIDE PIGMENT CONTAINING GAS STREAMS

CROSS-REFERENCE

This application is a continuation-in-part of U.S. Ser. No. 705,979, filed Feb. 16, 1968, now U.S. Pat. No. 3,493,342. Pyrogenic titanium dioxide pigment is produced by the high-temperature oxidation (above about 1,450° F.) of a volatilized titanium halide, generally titanium tetrachloride. In commercial scale operations said oxidation reaction is not normally sufficiently exothermic to maintain the desired reaction temperatures; accordingly, additional heat is generally supplied to the oxidation reaction zone such as by the burning of a fuel gas therein. The resulting reactor effluent stream, comprising the titanium dioxide solid product suspended in various process gases, is then cooled and thereafter treated in suitable collection apparatus wherein the titanium dioxide product is separated and collected from said process gases.

Normally, the cooling of the reactor effluent suspension is accomplished by both direct and indirect heat exchange steps. It is known, for instance, that maintenance of the reactor effluent stream at above about 1,400° F. can lead to degradation of the ultimate properties of the pigment product. Accordingly, in order to obviate this danger, a preliminary direct heat exchange step is often undertaken in which the reactor effluent suspension is quenched or diluted with cool substantially pigment-free process gases to below about 1,400° F. While it might be expected that this quench method of cooling would also be employed for cooling the suspension to below 600° F. or even further, e.g. 100° F., it should be borne in mind that such gas quench methods give rise to problems of excess dilution of the product stream, thereby imposing heavy physical and economic loads upon downstream collection and transport equipment. Thus, as a practical matter, the direct heat exchange quenching step is generally achieved substantially only to the extent necessary to bring the temperature of the reactor efflux to somewhat below (e.g. to 800° F.) the 1,400° F. temperature mentioned above as an approximate threshold value with respect to the pigment degradation problem. A more detailed account concerning process gas quenching of pyrogenic titanium dioxide containing suspensions can be had by reference to U.S. Pat. No. 2,508,272, to Booge, issued May 16, 1950.

In any case, the process gas quenched reactor effluent stream is then further cooled by indirect heat exchange such as by flowing thereof through suitable heat exchange. Usually, the apparatus employed is of the tube type wherein the reactor effluent is conducted through one or more tubes or conduits which are externally cooled by a fluid coolant. While the indirect heat exchange cooling may be effected to completion within the confines of a single exchange apparatus the use of plural apparatuses in series or parallel is often practiced. The intended cooling result of the indirect heat exchange step is to bring the temperature of the pigment-containing suspension down to between about 100° and about 600° F. whereupon the pigment may be collected from its association with the process gases by cycloning, electrostatic filtration, bag filtration, etc.

One of the more serious problems which has heretofore confronted the pyrogenic titanium dioxide producing industry resides in the fact that the titanium dioxide pigment forming part of the quenched reactor effluent suspension tends to deposit on heat exchanger surfaces. Over a period of time said deposition results in vastly reduced efficiency of heat transfer and, if (1) the deposition phenomenon is allowed to occur over a relatively lengthy period of time, or (2) is of a particularly acute nature, can cause substantial and deleterious increases in the pressure drop experienced across the heat exchange apparatus. In view of the fact that titanium dioxide is known to be a relatively good heat-insulative material it is not surprising that even a minor amount of such deposition on the heat exchanger surfaces can result in substantially and detrimentally reduced heat exchange efficiency. Said problem, notwithstanding the obvious economic disadvantages accruing thereto within the confines of the indirect heat exchange step per se, can also lead to degradation of downstream collection equipment.

Substantial research has been conducted by the titanium dioxide industry relating to the above-defined problem. Nevertheless, although some progress has been forthcoming, said problem persists. In some instances, critical materials of construction of the heat exchanger conduits have been found to beneficially affect the pigment-fouling phenomenon. Accordingly, in U.S. Pat No. 3,443,630, to Auld, issued May 13, 1969, magnesium is disclosed as an exceptionally beneficial material of construction for the heat exchanger conduits. In U.S. Pat. No 2,833,627 to Krchma it is disclosed that nickel in combination with aluminum results in improved heat exchanger operations. In a different mode of attack on the problem of heat exchanger conduit fouling, U.S. Pat. Nos. 2,899,278, 2,721,626 and 3,475,258 disclose various methods wherein particulate solids are charged into the pigment-laden reactor effluent suspension prior to entry thereof into the indirect heat exchange apparatus. Said solids are employed largely for their ability to physically purge the heat exchange conduit walls and thereby maintain them relatively free from pigment deposits thereon. In yet another attack upon this problem, the indirect heat exchange surfaces are maintained relatively free from adherent pigment coating thereon by the periodic propagation of pressure fronts directed into the heat exchange conduits. Such a process is exemplified by U.S. Pat. No. 3,364,983, to Krinov et al., issued Jan. 23, 1968. While all of the above prior art methods are directed at remedial solutions of the pigment fouling problem as it relates to indirect heat exchange cooling of titanium dioxide containing reactor effluent streams none appears to overcome what is apparently an inherent tendency of such hot effluent streams to deposit their solid product upon relatively cooler metallic surfaces. In accordance with the present invention, however, a unique process has been devised wherein said tendency has been greatly reduced.

It is a principal object of the invention to provide a novel process for cooling of pyrogenic titanium dioxide suspended in process gases.

It is another object of the invention to provide a method for treating suspensions of pyrogenic titanium dioxide in process gases so as to substantially avoid detrimental deposition of said titanium dioxide upon heat exchanger surfaces.

It is another object of the invention to provide a method for maintaining the heat transfer efficiency of indirect heat exchanger apparatus through which is conducted a stream comprising pyrogenic titanium dioxide suspended in process gases.

Other objects and advantages of the present invention will inpart be obvious and will in part appear hereinafter.

In accordance with the present invention it has been discovered that deposition of pyrogenic titanium dioxide from suspension in reactor effluent process gases upon indirect heat exchange surfaces is greatly alleviated by:

1. quenching said reactor effluent suspension to below about 1,400° F. by admixture thereof with cooled process gases;
2. further cooling the quenched reactor effluent suspension of (1) by indirect heat exchange treatment thereof;
3. treating the cooled process gas stream forming part of said suspension with water at a temperature below about 600° F;
4. separating the titanium dioxide solid product from suspension in said reactor effluent process gases; and
5. recycling at least a portion of the process gases from step (4) to step (1).

A better understanding of the improved process of the present invention can be had by reference to the drawing forming part hereof wherein there is provided a diagrammatic representation of a flowsheet depicting a typical pyrogenic titanium dioxide producing process in which the improved process of the invention is practiced.

Referring now to said drawing there is produced in reactor 1 pyrogenic titanium dioxide pigment by conversion of a volatilized titanium compound in the presence of oxygen. Heat is normally supplied to the reaction zone such as by the combustion of a fuel gas (such as carbon monoxide) therein. Moreover, several adjuvants are known which beneficially affect the ultimate properties of the pigment product when introduced into the oxidation reaction zone. Accordingly, the addition of such adjuvants as potassium, silicon, aluminum, water-forming compounds, etc. in minor amounts, i.e. less than about 5 wt. percent of the total solid product, is also generally practiced and is specifically contemplated within the scope of the present invention. In any case, the effluent stream from said oxidation reactor comprises titanium dioxide pigment suspended in various gaseous byproducts of the oxidation and, if practiced, combustion reactions. The temperature of said stream is normally above about 2,000° F. A material balance of the gases exiting a representative pyrogenic titanium dioxide producing reactor utilizing $TiCl_4$ as the pigment producing feedstock are shown in table 1 below:

Table I TZ

|  | Vol. % TZ |
|---|---|
| $Cl_2$ | 50 |
| $N_2$ | 10 |
| $CO_2$ | 25 |
| $O_2$ | 15 |
| $AlCl_3$ | 0.02 |
| $TiCl_4$ | 0.04 tz |

The reactor effluent stream containing the suspended pigment is then quenched by process gas dilution thereof in quench zone 2. As mentioned previously, said quench is required to reduce the temperature of the pigment to below about 1,400° F. in order to avoid degradation thereof. In practice, however, it will often be desirable to dilute the reactor effluent stream with a sufficient amount of cooled process gases to result in a suspension having a temperature of between about 800° to about 1,000° F. Quenching to within this temperature range provides a reasonable safety factor while incurring a generally acceptable stream dilution penalty. The volume of process quench gas employed per volume of reactor effluent stream will, of course, vary depending upon such considerations as the temperature of the quench gas employed, the extent of cooling of the reactor effluent stream desired, etc. Suffice it to say, therefore, that said quench gas/reactor effluent volume ratio will generally be at least 1 : 1 or larger. Indeed, quench gas/reactor effluent volume ratios of 2 : 1, 4 : 1 or even higher are also specifically contemplated.

The thusly quenched reactor effluent, now cooled to below about 1,400° F is next conducted through indirect heat exchange cooler(s) 3A and 3B wherein said quenched effluent is further cooled to below about 600° F. As mentioned previously, said heat exchange cooler (s) are usually of the tube type wherein heat exchange is effected from the reactor effluent to one or more tubes through which said effluent is conducted and thence into a coolant fluid surrounding the exteriors of said tubes.

Upon exiting from indirect heat exchange cooler(s) 3A and 3B, the pigment suspension is then conducted into any suitable gas/solid separator 4, the more common types presently commercially employed being of the bag filter or cyclonic varieties or combinations thereof. At this juncture it is to be noted that our copending application, U.S. Ser. No. 705,979, discloses specific improvements relating to bag filter operations by virtue of injection of minor amounts of water into the reactor effluent suspension prior to entry of said suspension into the bag filtration apparatus. In any case, whatever the specific method employed in separating the pigment from its associated process gases, the separated pigment is collected as product and the process gases, now substantially freed of their pigment burden, are conducted out of separator 4 for further treatment as desired. However, a substantial volume of said cooled process gases are employed as the reactor effluent quench and are thus recycled through process line 6 into gas quench zone 2. Normally, the gases exiting separator 4 will be at a temperature at least somewhat above the dewpoint of the condensable components thereof. Accordingly, it will ordinarily be preferred that further cooling of the recycled portion of said process gases take place in indirect heat exchange cooler 7 prior to charging thereof into gas quench zone 2. In this manner, the further cooling of said quench gas will serve to minimize the amount of reactor stream dilution resulting in quench zone 2.

In the practice of the present invention, a minor amount of water is charged into the process gas stream at any point subsequent to cooling thereof to below about 600° F. If said water is injected into the process gas stream at temperatures substantially above 600° F., e.g. 800° F., undesirably excessive reaction of said water with the halogen component of the said stream can occur. Accordingly, in the generalized flow diagram shown in the drawing, the water injection step 5 of the invention can be advantageously accomplished at any point of the recycle loop formed between indirect heat exchange cooler 3B and the point of introduction of the recycled quench gas into quench zone 2. Where bag filtration or other separation precesses wherein a porous filter material is employed to effect separation of the process gases from the suspended pigment, however, it is much preferred that the water be injected into the titanium-dioxide-pigment-containing stream at a locus between said indirect heat exchange cooler 3B and gas/solid separator 4. In this manner, the filtration advantages specifically disclosed in our application, U.S. Ser. No. 705,979, as well as the indirect heat exchange operational improvements disclosed herein will be served.

The particular manner in which the water is injected into the cooled reactor process gas stream is not generally critical provided that good mixing of the water with said stream is effected. Many methods for accomplishing said injection will be recognized as satisfactory by those skilled in the art. We have found, for instance, that said water can be suitably injected into the cooled process gas stream by means of various nozzle apparatuses. However, while it is generally entirely suitable to charge the water in liquid form into the cooled process gas stream, it will normally preferable, in terms of ease of accurate metering, rapid contact, etc. to first vaporize the water and thereafter inject the vapors, as stream, into the process gas stream.

The amount of water to be contacted with the cooled process gas stream is also subject to considerable variation and is dictated, to a large extent, by the concentration of titanium and aluminum halides present in said stream. For instance, we have found that the injection of as little as about 50 percent of the equivalent amount of water required to stoichiometric react with the total titanium and aluminum halides present in the effluent stream to be treated can provide a marked decrease in the tendency of the pigment of deposit on the surfaces of the indirect heat exchange apparatus. However, it is preferred that the amount of water utilized represent at least 75 percent of said stoichiometric equivalent. It is desirable, moreover, to avoid the injection of substantial excesses (e.g. 200 percent of the stoichiometric equivalent) of water because of the generally highly corrosive nature of the wet halide gases normally formed as a result thereof.

As indicated in table I, the total concentration of titanium and aluminum halides present in a typical reaction zone effluent of a pyrogenic titanium dioxide (1) (2) producing process is normally exceedingly low. However, in large measure, the operability of our invention appears to reside in the theory that the presence of even trace amounts of titanium and/or aluminum halides are major causal factors in the pigment deposition problem relating to indirect heat exchanger operations. The concentrations of these halides can be determined, for instance, by chromatographic analysis of the effluent gas stream or, if desired theoretically, by analysis of the reaction equilibria and kinetics of the titanium halide oxidation reaction under the particular conditions practiced.

There follows an illustrative non limiting example:

Example

In accordance with a process flow diagram substantially as shown in the drawing there is continuously produced in reactor 1 a suspension comprising pyrogenic titanium dioxide pigment and associated reaction gases at the respective rates of about 5,000 lbs./hr. titanium dioxide and about 92,000 SCFGH reaction gases. The titanium compound utilized as the feedstock was titanium tetrachloride. Additionally, there was into the reactor about 100 lbs./hr. of aluminum chloride adjuvant. The reactor effluent was quenched from about 2,300° F. to about 1,300° F. substantially immediately upon exiting the reactor by admixing said effluent in quench zone 2 with about 300,000 SCFH of reactor effluent gases previously cooled to about 150° F. Next, the thusly quenched effluent suspension was charged serially through two liquid-cooled shell and tube heat exchangers 3A and 3B of the type disclosed in U.S. Pat. No. 3,364,483, each of said exchangers comprising 200 tubes each of about 2-inch I.D. and 20-foot length. Additionally, the temperature of the efflux from each of said exchangers was continuously monitored over the period of the run. The cooled efflux from exchanger 3B was then conducted into solid gas separator 4 of the bag filter type and a 300,000 SCFH cut of the substantially solids-free process gases there from was recycled through indirect heat exchange step 7 into quench zone 2 while the remainder was subjected to a chlorine recovery treatment. Table I, following, present the efflux temperature profile of heat exchangers 3A and 3B as a function of time:

TABLE I

| Time of Operation (Hours) | Efflux Temperature (°F) | |
| --- | --- | --- |
| | Exchanger 3A | Exchanger 3B |
| 0 | 580 | 300 |
| ½ | 590 | 310 |
| 1 | 600 | 315 |
| 1½ | 610 | 320 |
| 2 | 625 | 340 |
| 2½ | 650 | 360 |
| 3 | 690 | 390 |
| 3½ | 725 | 425 |
| 4 | 800 | 500 |

After four hours of operations, the temperature of the efflux exiting heat exchanger 3B was adjudged sufficiently high to constitute a danger to down stream equipment. Accordingly, the run was shut down and each of heat exchangers 3A and 3B were dismantled for inspection and cleaning. It was noted that the tube surfaces thereof bore substantial deposits of titanium dioxide.

Another titianium-dioxide-producing run was accomplished under substantially the same conditions as employed previously. Shortly after start up, the reactor effluent was sampled upon exiting heat exchanger 3B and analyzed quantitatively for the presence of titanium and aluminum chloride and it was determined that said effluent comprised about 45 lbs./hr. of titanium chlorides and about 20 lbs./r. of aluminum chlorides. After four hours of operation, water was injected, as steam, into the effluent stream exiting heat exchanger 3B at a rate of about 20 lbs./hr. H₂0. Thereafter, the run was continued for about 24 hours followed by shut down, dismantling of heat exchangers 3A and 3B and inspection thereof. As will be noted in table II following, the water injection step not only avoided further increases in the loss of heat exchange efficiency of said indirect heat exchangers, but also substantially reversed those losses which were incurred over the first four hours of operations when no water injection was employed.

TABLE II

| Time of Operation (Hours) | Efflux Temperature (°F) | |
| --- | --- | --- |
| | Exchanger 3A | Exchanger 3B |
| 0 | 580 | 300 |
| ½ | 590 | 310 |
| 1 | 600 | 315 |
| 1½ | 610 | 320 |
| 2 | 625 | 340 |
| 2½ | 650 | 360 |
| 3 | 690 | 390 |
| 3½ | 725 | 425 |
| 4 | 800 | 500 |
| WATER INJECTION | | |
| 8 | 600 | 320 |
| 12 | 590 | 310 |
| 16 | 595 | 315 |
| 20 | 595 | 315 |
| 24 | 590 | 315 |

Upon inspection, the tubes of heat exchangers 3A and 3B were found to bear only a light dusting of solids upon the surfaces thereof.

When the above run is repeated with the sole exception that the steam is injected into the substantially pigment-free process gases entering heat exchanger step 7 rather than into the pigment suspension exiting heat exchanger 3B, substantially similar thermal efficiency improvements in indirect heat exchangers 3A and 3B operations result.

What is claimed is:

1. A process for cooling a reaction zone effluent produced by vapor phase oxidation of a titanium tetrahalide and comprising titanium dioxide suspended in reaction zone off-gases, said process comprising:
   a. quenching said reaction zone effluent to between about 800° F. and about 1,400° F. by admixture thereof with cooled reaction zone off-gases;
   b. further cooling the quenched effluent of (a) by indirect heat exchange to below about 600° F;
   c. separating said titanium dioxide from said reaction zone off-gases;
   d. recycling at least a portion of said cooled reaction zone off-gases from (c) to (a); and
   e. contacting at below about 600° F. at least that portion of said reaction zone off-gases recycled to (a) with water in an amount (1) sufficient to provide at least 50 percent of the stoichiometric equivalent for reaction thereof with the total amount of titanium and aluminum halides present therein, and (2) insufficient to cause substantial further cooling of said reaction zone off-gases.

2. The process of claim 1 wherein the amount of water contacted with said reaction zone off-gases represents at least 75 percent of the stoichiometric equivalent for reaction thereof with said total amount of titanium and aluminum halides present in said reaction zone off-gases.

3. The process of claim 1 wherein said contact of (e) is achieved prior to the separation step of (c) and said separation step is accomplished by filtration of said suspension through a porous filter medium.

4. The process of claim 1 wherein said contact of (e) is achieved subsequent to the separation step of (c).

5. The process of claim 1 wherein said water is in vapor form when contacted with said reaction zone off-gases.

6. The process of claim 1 wherein the titanium tetrahalide converted to titanium dioxide is titanium tetrachloride.

7. The process of claim 1 wherein the oxidation reaction there is additionally charged to the reaction zone an aluminum halide adjuvant.